(12) United States Patent
Despres

(10) Patent No.: US 6,641,338 B2
(45) Date of Patent: Nov. 4, 2003

(54) PLUG EJECTING HOLE SAW WITH INTERCHANGEABLE SAW CUPS HAVING DIFFERENT SIZE ATTACHMENT BORES

(76) Inventor: Roger J. Despres, 17230 San Mateo St., #L 12, Fountain Valley, CA (US) 92708

(*) Notice: Subject to any disclaimer, the term of this patent is extended or adjusted under 35 U.S.C. 154(b) by 0 days.

(21) Appl. No.: 10/145,690

(22) Filed: May 13, 2002

(65) Prior Publication Data
US 2002/0131835 A1 Sep. 19, 2002

Related U.S. Application Data

(60) Continuation-in-part of application No. 09/929,689, filed on Aug. 14, 2001, now Pat. No. 6,409,436, which is a division of application No. 09/517,215, filed on Mar. 2, 2000, now Pat. No. 6,341,925.

(51) Int. Cl.[7] .................. B23B 41/02; B23B 51/04; B27B 5/12
(52) U.S. Cl. ........................................ 408/204
(58) Field of Search ........................ 408/204, 226, 408/239 R, 703; 403/348, 349

(56) References Cited

U.S. PATENT DOCUMENTS

| 4,303,357 A | * | 12/1981 | Makar | 408/204 |
| 6,341,925 B1 | * | 1/2002 | Despres | 408/204 |
| 6,409,436 B1 | * | 6/2002 | Despres | 408/204 |

* cited by examiner

Primary Examiner—Steven C. Bishop
(74) Attorney, Agent, or Firm—William L. Chapin

(57) ABSTRACT

A plug ejecting hole saw (20) includes an arbor holder (21) removably attachable to saw cups (22A), (22B) having small and large non-circular attachment bores (41A), (41B), lockingly engageable by front and rear bosses (61), (63) of a nose-piece (54) which protrudes from a locking body (50) longitudinally slidably held in a collar (45). Bosses (61), (63) have transverse grooves (68), (68B) intersected by a longitudinal groove (53) slidably holding a lug (81) biased forward in groove (53) by a spring (90) to block grooves (68), (68B) with front and rear locking tabs (110), (120); grooves (68) (68B) are unblocked to rotatably engage wall segments of a saw cup bore (41A), (41B), by pushing a saw cup (22A) (22B) rearward against tabs (110), (120). Grooves (68), (68B) are unblocked to enable rotatable disengagement of a saw cup from nose-piece (54) by pulling collar (45) rearward relative to a saw cup.

20 Claims, 11 Drawing Sheets

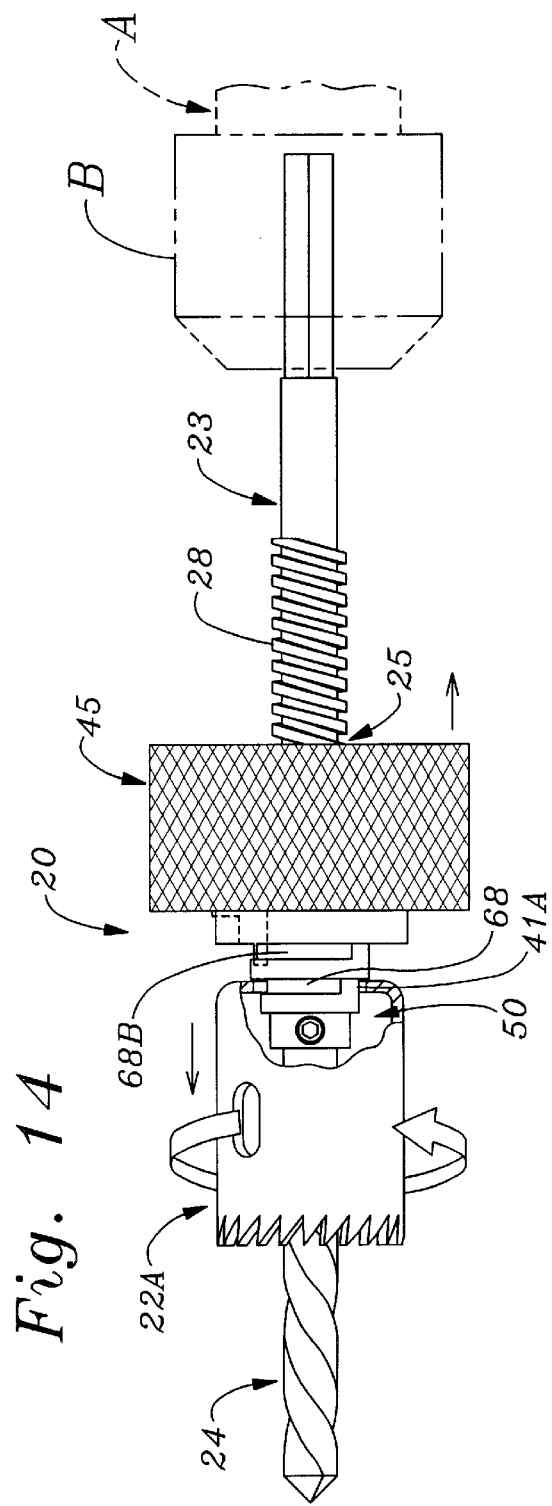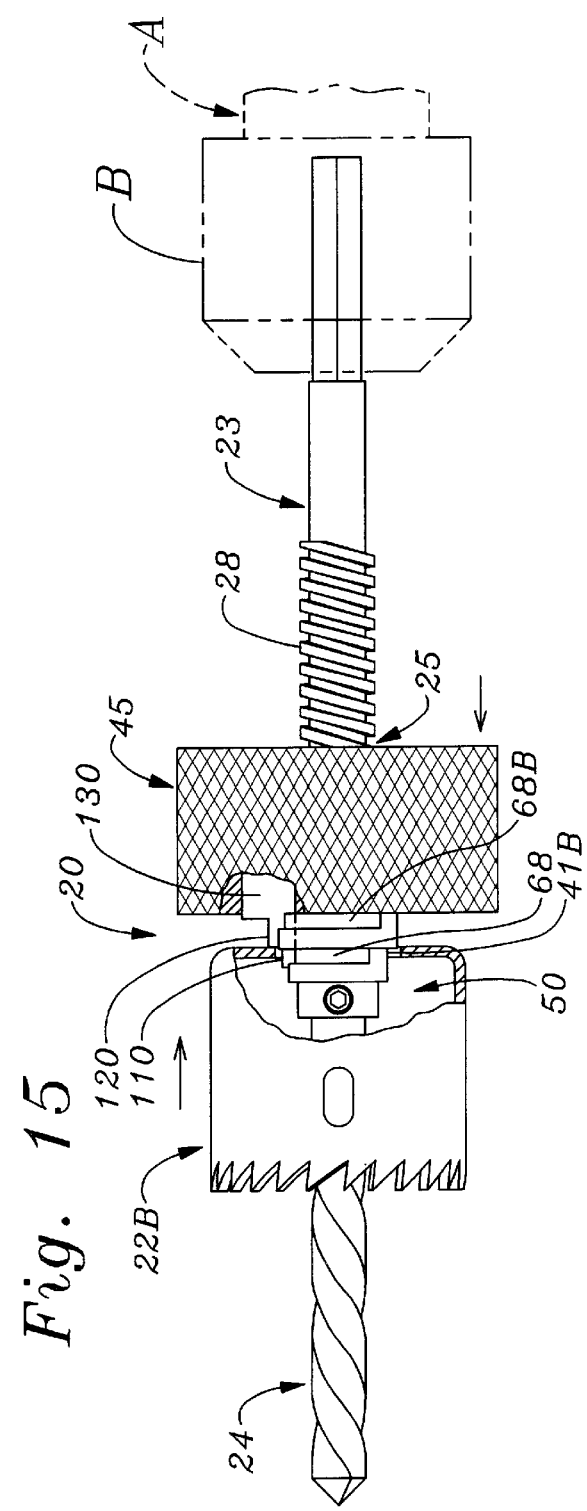

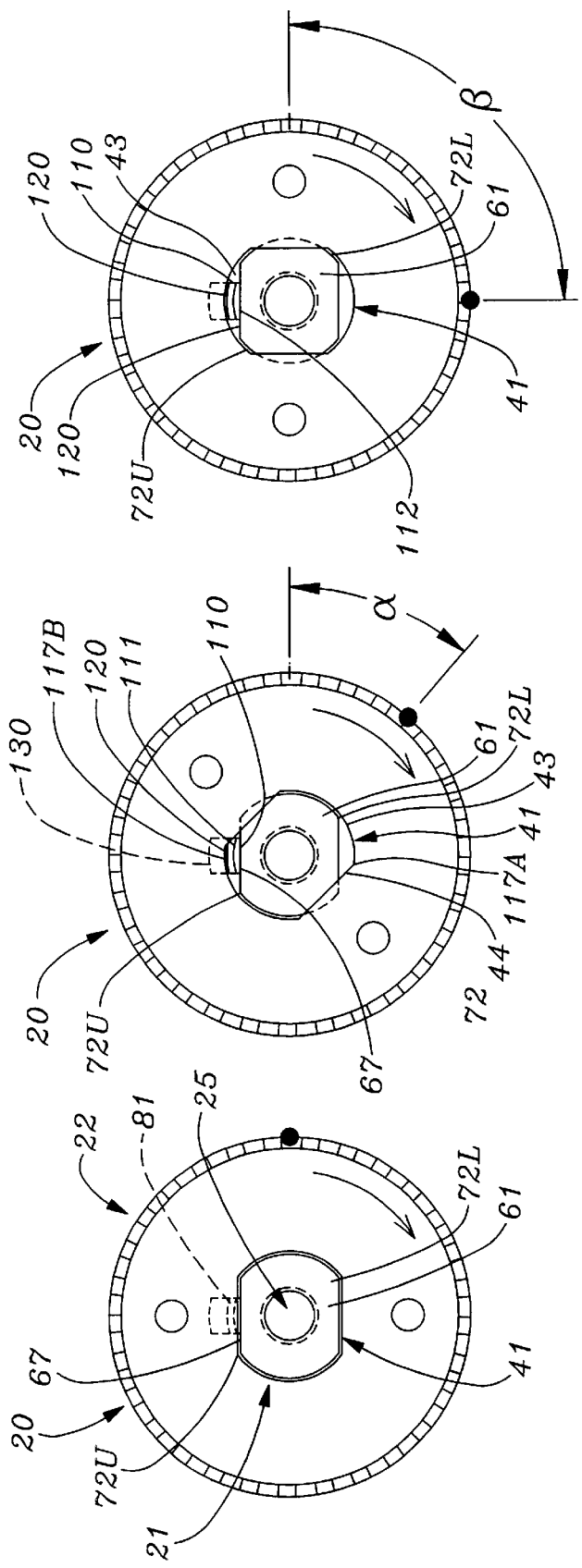

PLUG EJECTING HOLE SAW WITH INTERCHANGEABLE SAW CUPS HAVING DIFFERENT SIZE ATTACHMENT BORES

This application is a continuation-in-part of Ser. No. 09/929,689 filed Aug. 14, 2001 now U.S. Pat. No. 6,409,436 which is a division of application Ser. No. 09/517,215, filed Mar. 2, 2000, now U.S. Pat. No. 6,341,925, issued Jan. 29, 2002.

BACKGROUND OF THE INVENTION

A. Field of the Invention

The present invention relates to saws used for cutting circular holes through objects made of wood and various other materials, of the type utilizing a cylindrical saw cup coaxially fastened to an arbor holding a pilot drill which protrudes forward of cutting teeth provided on a front annular surface of the saw cup. More particularly the invention relates to a hole saw which automatically ejects a plug sawed from a workpiece, in which hole saw cups of various diameters and having different sized attachment bores may readily be interchangeably mounted on a novel single-ended arbor-holder by a twisting, snapping action.

B. Description of Background Art

In U.S. Pat. Nos. 4,741,651 and 5,096,341, the present inventor disclosed plug ejecting hole saws which utilize a left-hand threaded mandrel or arbor that holds a pilot drill, the shank of which is secured in an enlarged diameter flange or collar located at the front end of the arbor. The arbor is screwed into a threaded, arbor-holder bore disposed coaxially though a bushing or thicker portion of a circular disk-shaped base plate which forms the rear end wall of a cup-shaped saw body which has angled circumferentially spaced apart cutting teeth in the front annular end wall thereof. In a hole saw cup of this type, the front, cup-shaped portion of the saw cup and the thicker rear base plate or arbor-holder bushing are generally fabricated as separate metal parts which are brazed together. Thus, this type of hole saw is sometimes referred to as a "bi-metal" hole saw.

A novel feature of the inventions disclosed in the aforementioned patents of the present inventor comprises left-hand threading of both the outer surface of the arbor and the inner threaded bore through the saw cup base. With this arrangement, when the arbor is threaded counterclockwise into the saw cup arbor-holder bore, as viewed from the front of the saw cup and pilot drill end of the arbor, the front flange portion of the arbor advances rearwardly to seat against the inner front wall surface of the saw cup base. The arbor shank, which protrudes rearwardly from the saw cup base is then secured in the collet of a power drill. When the power drill is powered on to turn the pilot drill bit and saw in the usual clockwise cutting direction, as viewed from the rear, shank end of the bit, a counterclockwise reaction torque is exerted on the saw cup teeth by frictional resistance offered by workpiece in response to the cutting action, tending to further tighten and secure the arbor flange against the inner surface of the saw cup base. When the saw cup has penetrated the thickness of a workpiece such as a door panel, a cylindrically-shaped plug of workpiece material becomes lodged tightly within the saw cup, and in prior art hole saws, is difficult to remove from the saw cup. However, in accordance with the '651 and '341 patents, a plug lodged within the saw cup may readily be ejected by powering the drill in a reverse, i.e., counterclockwise direction after a hole has been bored through a workpiece, while maintaining the saw cup stationary. Rotating the drill shank and arbor in a counterclockwise direction by the power drill causes the arbor to be advanced axially forward within the threaded bore of the saw cup, and the front flange of the arbor to abut the rear surface of the plug and eject it forward out of the saw cup bore.

The above-described plug ejecting feature of hole saws disclosed in the present inventor's '651 and '341 patents has provided a highly effective and widely accepted improvement in bimetal hole saws. Subsequent to issuance of those two patents, U.S. Pat. No. 5,435,672 was issued for adapters having a left-hand threaded arbor-receiving bore, and a right-hand external bore. The adapters were designed to be threaded into right-hand threaded arbor-holder bores of existing saw cups, thus accommodating left-hand threaded arbors and permitting the present inventor's novel plug ejecting function to be accomplished using existing hole saw cups having right-hand threaded arbor-holder bores.

Although the novel plug ejecting hole saws disclosed in the present inventor's '651 and '341 patents constituted a substantial advancement in the art for hole saws having a base provided with a threaded bore for receiving an arbor, there is another type of widely employed hole saw cup which formerly could not utilize the advantageous plug ejecting construction disclosed in those patents. This type of hole saw is sometimes referred to as a "Carbon" type, since it uses hole saw cups fabricated as a unitary structure, e.g., a deep drawn cup, made from high carbon steel. In this type of hole saw, the saw cup base is made of relatively thin stock, thus precluding the use of threaded bore through the base as a means for attaching the saw cup to an arbor. Instead, hole saws with thin base walls are typically provided with a non-circular, e.g., a double-D-shaped central bore through the base, which receives the complementary-shaped, enlarged rear portion of an arbor which is secured to the base by a threaded fastening member.

In response to a need for a plug ejecting hole saw which may utilize thin base wall, non-threaded saw cups of the type described above, the present inventor developed a plug ejecting hole saw which utilizes thin base wall, non-threaded saw cups having an oblong or "double D"-shaped attachment bore. That device, described in U.S. Pat. No. 6,341, 925, Plug Ejecting Hole Saw With Twist-Locking Interchangeable Saw Cups, includes an arbor holder comprising a slotted cylindrical body coaxially held in spring biased, longitudinally slidable disposition within a collar. The slotted cylindrical body has a pair of longitudinally disposed, diametrically opposed grooves formed in opposed flats formed in a nose piece portion of the cylindrical body which protrudes forward from the collar. Each longitudinal groove longitudinally slidably holds a locking tab which is spring biased forwardly to an outward position to thereby block an adjacent one of a pair of circumferential grooves formed in two curved portions of the nose piece located between the two flats. The locking tabs are pushed axially rearward against the spring force by a saw cup base to unblock the circumferential grooves, enabling peripheral edge wall surfaces of the saw cup bore to be rotated into the circumferential grooves, thereby preventing relative longitudinal movement between the saw cup and the arbor holder. When the saw cup has been rotated sufficiently far, the locking tabs spring forward into the larger radius, curved portions of the saw cup attachment bore to thereby lock the arbor holder to the saw cup for both clockwise and counterclockwise rotations.

An embodiment of the device disclosed in the '925 patent includes a second, rear nose piece protruding from the cylindrical body at the opposite longitudinal end from the front nose piece, the rear nose piece being of a different size to fit saw cups having a different size attachment bore than the front nose piece, a second spring bias means, a second pair of locking tabs, and frictional means to position the cylindrical body and nose piece portions axially centered within the collar. The present invention was conceived of to provide a plug ejecting hole saw which utilizes a novel single-ended arbor holder that is interchangeably and bi-directionally lockable to saw cups having at least two different sized attachment bores.

OBJECTS OF THE INVENTION

An object of the present invention is to provide a plug ejecting hole saw including an arbor-holder which can be attached to hole saw cups of various body diameters and attachment bore sizes.

Another object of the invention is to provide a plug ejecting hole saw including an arbor-holder which can be secured to the base of a hole saw cup with non-threaded fastening means including a single spring-loaded locking tab.

Another object of the invention is to provide a plug ejecting hole saw including an arbor-holder which utilizes a single spring-loaded locking tab to removably secure the arbor holder to the base of a non-threaded hole saw cup having an unthreaded attachment bore through the base of the hole saw cup for attaching to an arbor, the arbor-holder having therethrough an axially disposed left-hand threaded bore for threadingly receiving an arbor.

Another object of the invention is to provide a plug ejecting hole saw including an arbor-holder which is removably securable to a hole saw cup provided with a non-circular attachment bore through its base, the arbor-holder having a front nose piece boss insertable forward through the attachment bore, the boss having formed in curved wall surfaces thereof a pair of spaced apart circumferential grooves which rotatably receive peripheral edge walls of the saw cup attachment bore to prevent relative longitudinal motion between the saw cup and arbor holder, and a locking tab which springs forward to lock the arbor-holder against disengagement from the saw cup when the arbor-holder is rotated clockwise and counterclockwise with respect to the saw cup base.

Another object of the invention is to provide a plug ejecting hole saw including an arbor-holder having an outer collar and inner body disposed axially therethrough, the inner body having a lefthand threaded bore disposed axially therethrough for receiving an arbor, a front nose piece having a boss which slidably holds a locking tab which releasably blocks a first circumferential groove which cooperates with a second circumferentially spaced apart groove to lockingly engage the base of a hole saw cup when the front nose piece boss has been inserted into and rotated in a first direction within an attachment bore provided through the base of saw cup, the locking tab and groove being released from locking engagement with the saw cup base when the collar of the arbor-holder is pulled axially rearward with respect to the inner body thereof to thereby retract the locking tab, and rotated in the opposite direction.

Another object of the invention is to provide a plug ejecting hole saw including an arbor-holder having an outer collar which axially slidably holds an inner body having disposed axially therethrough a left-hand thread for receiving an arbor, the inner body having a nose piece provided with a first, front, nose piece boss lockingly engageable and releasable within a first size attachment bore through a selected one of a first plurality of hole saw cups, and a second, larger nose piece boss rearward of the front boss releasably engageable within a second, larger sized attachment bore through a selected one of a second plurality of hole saw cups.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, I do not intend that the scope of my exclusive rights and privileges in the invention be limited to details of the embodiments described. I do intend that equivalents, adaptations and modifications of the invention reasonably inferable from the description contained herein be included within the scope of the invention as defined by the appended claims.

SUMMARY OF THE INVENTION

Briefly stated, the present invention comprehends a plug-ejecting hole saw device for use with power drills. The device includes an arbor holder which has a left-hand threaded bore that threadingly receives an arbor which includes a front pilot drill and a rear shank which is clamped into the chuck of a power drill, and a saw cup which is attached to the arbor holder, coaxially over the arbor. When the power drill is operated in a reverse, i.e., counterclockwise sense, the arbor advances threadingly in the arbor holder to automatically eject a cylindrically-shaped plug produced in cutting a hole through an object by the drill powered in a clockwise sense.

A plug ejecting hole saw according to the present invention includes an arbor-holder removably attachable to a hole saw cup selected from a plurality of hole saw cups of various sizes. A main embodiment of a plug ejecting hole saw according to the present invention includes an arbor-holder removably attachable to a selected hole saw cup of the type having a cylindrical cup-shaped body provided with angled cutting teeth protruding from the front annular surface of the body, and a relatively thin rear circular base wall having through its thickness dimension a non-circular attachment bore for attachment to an arbor concentrically aligned with the front annular surface of the body, A preferred arbor attachment bore for saw cups according to the present invention has a "double-D" shaped perimeter formed from diametrically opposed arc segments of a circle which is concentric with the circular hole saw cup face, the circle being truncated on opposite sides thereof by a pair of chords equidistant from and parallel to a diameter which perpendicularly bisects the arcs. Thus, a preferred arbor attachment bore provided through the base of a saw cup according to the present invention has an inner peripheral edge wall consisting of a pair of diametrically opposed laterally symmetric circular arc segments centered at 90-degree and 270-degree locations of a circle, and two diametrically opposed flat segments centered on zero-degree and 180-degree locations of the circle.

A main embodiment of an arbor-holder for use with hole saw cups of the type having a double-D-shaped arbor-holder attachment bore through the base of the saw cup includes an outer cylindrical housing or collar having therethrough a circular bore which axially slidably holds a body having cylindrical outer wall surfaces which fit within the collar bore. The cylindrical body has a nose piece which protrudes axially outwardly of the front annular surface of the collar, the nose piece having a longitudinally or axially disposed front boss that has an outer transverse cross-sectional shape similar to that of a double-D-shaped arbor-holder attachment bore through a saw cup base, but has a slightly smaller size permitting ready insertion of the nose piece boss into the attachment bore.

The nose piece boss has protruding radially inwards from opposed cylindrical wall surfaces thereof a pair of transversely disposed grooves. Each groove has in a transverse sectional view the shape of a circular arc segment and protrudes radially inwardly into a separate one of two longitudinally disposed curved side walls of the nose piece. Also, each of the grooves has a transverse front or outer edge wall located rearwardly of and parallel to the outer front face of the front nose piece boss, forming between the front groove edge wall and the front nose piece face an annular arc-shaped front flange. A rear transverse edge wall of each of the two transversely disposed grooves is defined by a front transversely disposed annular wall surface of a rear portion of the nose piece.

Each of the two transverse nose-piece boss grooves is disposed circumferentially from a location circumferentially spaced apart from a junction between a flat and curved side of the double-D-shaped nose piece, the junctions comprising a pair of diagonally opposed, longitudinally disposed shoulder ribs, which are disposed rearwardly from the front transverse face of the nose piece boss to the front or outer transversely disposed annular wall surface of a larger diameter rear portion of the nose piece. The nose piece boss also has a pair of parallel, upper and lower laterally disposed flats spaced equal distances from the center of the boss. One of the flats, e.g., the upper flat, has formed therein a rectangularly-shaped longitudinal groove which is disposed rearwardly from the longitudinally front or outer transverse edge wall of a transverse groove.

The longitudinal groove is laterally centered on a longitudinal plane which bisects the two diametrically opposed flats of the nose piece. Also, the longitudinal groove is disposed rearwardly or axially inwardly through an adjacent arc-shaped transverse groove and extends longitudinally rearward through the inner cylindrical body to a location forward of the rear transverse wall surface of the inner cylindrical body, and penetrates the outer cylindrical wall surface of the inner cylindrical body. The longitudinal groove longitudinally slidably receives a step-shaped locking tab support lug having a "front step" portion which functions as a front locking tab that has a longitudinal thickness approximating that of the transverse groove in the nose piece, and a radial thickness slightly less than that of the radial depth of the longitudinal groove. The lug also has a rear block portion of greater radial thickness than the front locking tab, which is slidably received within that portion of a longitudinal groove located within the inner cylindrical body. The rear portion of the lug is urged axially forward by spring means, e.g., a helical compression spring, and is limited in forward axial movement by contact of a rearwardly protruding retainer pin attached to the upper surface of the top step portion of the lug and slidably received within a threaded blind bore axially disposed within the collar, with an end wall of the bore.

When the inner cylindrical body of the arbor-holder is pushed axially forward or outwardly from the collar against the resilient force provided by the compression spring, the nose piece is displaced forward or axially outwardly of the front annular face of the collar. This displacement causes the front shoulder edges of the longitudinal locking tab groove to move forward of the front transverse edge wall of the locking tab. With the cylindrical inner body pushed sufficiently far forward within the collar, the rear transverse edge wall of the transversely disposed groove is moved axially outwards or forward of the front edge of the tab, unblocking the junction or passageway between the transverse groove and the longitudinal tab groove adjacent to it. Also, when the nose piece is inserted forward into the arbor-holder attachment bore of a hole saw cup, contact of the rear surface of the saw cup with the front vertical surface of the locking tab pushes the locking tab rearwardly within its longitudinal groove against a resistance force provided by the compression spring. Rearward motion of the locking tab unblocks the transverse groove, thus allowing an adjacent portion of the peripheral attachment bore edge wall to be rotatably received within an adjacent transverse groove of the nose piece boss, and a diagonally opposite transverse groove not provided with a locking tab to receive a diagonally opposite portion of a peripheral attachment bore edge wall, and thereby allowing the entire arbor assembly to be rotated clockwise with respect to the hole saw cup. When the rotation angle approximates forty-five degrees, the locking tab springs axially forward in response to a spring extension force exerted by the compression spring, into a radial clearance space formed between the nose piece flat holding the tab, and an adjacent curved inner peripheral edge wall of the saw cup attachment bore. In this disposition, the curved portions of the nose piece boss, which have outer longitudinal surfaces spaced farther apart than the flats of the peripheral wall adjacent the attachment bore through the saw cup base, are axially aligned with the peripheral wall flats. Thus, the peripheral wall flats are retained axially within the transverse nose piece grooves in this position. Further clockwise rotation of the arbor-holder with respect to the saw cup base is limited by contact of a longitudinally disposed nose piece rib with an intersection between the curved and flat portions of the peripheral edge wall of the hole saw cup attachment bore. Counterclockwise rotation of the arbor-holder relative to the saw cup is limited by contact of a longitudinal edge of the locking tab with an intersection between a curved and flat edge wall of the saw cup attachment bore. With this arrangement, the saw cup is locked axially and rotationally to the arbor-holder.

The inner cylindrical body of the arbor-holder according to the present invention has through its thickness dimension a longitudinally disposed bore coaxial with the arbor-holder collar. The bore has internal left-hand threads adapted to receive an arbor threaded into the bore through a front opening thereto in the front or outer face of the nose piece, either before or after the arbor-holder has been snap-locked into a saw cup as described above.

The arbor is provided with a shank which protrudes rearwardly from the rear surface of the arbor-holder. A collet flange at the front end of the arbor-holder holds a pilot drill, and the rear face of the collet flange seats against the front face of the arbor-holder nose piece, when the arbor is threadingly tightened in the arbor-holder bore in a counterclockwise sense, as viewed from the front of the pilot drill. To use the hole saw, the rearwardly protruding shank of the arbor is clamped in the chuck of a power drill. Then, the tip of the pilot drill is placed in perpendicular contact with a workpiece, and the drill is then powered on to rotate the hole saw in a clockwise sense as viewed from the shank end of the hole saw, thereby cutting a circular hole through a workpiece and leaving a cylindrically-shaped plug of workpiece material lodged within the hole saw cup. The drill is then angled slightly away from the orientation perpendicular to the workpiece used to bore the hole, thus slightly cocking the hole saw cup within the hole cut through the workpiece, and thereby frictionally lodging the hole saw cup within the workpiece hole. The power drill is then powered on in a reverse sense to rotate the arbor in a reverse sense, thus causing the arbor and flange to be threadingly advanced within the arbor-holder bore, thereby ejecting the workpiece plug forwardly out from the saw cup body.

When it is desired to remove the arbor-holder from a saw cup body, e.g., to install the arbor-holder and arbor in a different saw cup body, which may be of a different size, the collar of the arbor-holder is pulled rearwardly with respect to the front nose piece and saw cup body, thus retracting the locking tab in the longitudinal nose piece groove to thereby unblock the adjacent transverse groove and adjacent curved peripheral wall of the saw cup attachment bore. With the locking tab thus disengaged from the hole saw cup, the arbor-holder is rotated counterclockwise to align the flats and curves of the nose piece boss once again with the correspondingly shaped edge walls of the saw cup attachment bore, thus allowing the nose piece and entire arbor-holder to be pulled rearwardly and disengaged from the saw cup body.

In a preferred embodiment of a plug ejecting hole saw device according to the present invention, the nose piece of the cylindrical body is provided with a second, longitudinally intermediately located double-D-shaped boss rearward of the front boss, the second boss being coaxially aligned with the front boss, but having a larger diameter for use with larger saw cups having a larger attachment bore. The rear nose piece boss is identical in shape and function to the front nose piece boss. However, in this embodiment, the locking tab lug has a second, intermediate step located between a front step and a rear block portion of the lug. Thus, as in the single boss embodiment, the locking tab lug for the double boss arbor holder has a first, front locking tab consisting of a front step portion which has a radial thickness slightly less than that of the radial depth of the longitudinal tab groove which penetrates the transverse upper groove of the front nose piece boss. This reduced radial height or thickness provides clearance for the flat peripheral edge wall of a larger diameter attachment bore through a larger hole saw cup, the clearance enabling the saw cup to be pushed rearward of the front nose piece, to fit conformally over a larger diameter, rear boss. When the periphery of the larger diameter attachment bore is axially aligned with the rear boss, and pushed rearward, the rear wall surface of the saw cup presses against a front vertical surface of the second, intermediate step, which is intermediate in height between the front step and the rear block portion of the lug. The intermediate, or second, step which may have a radial thickness slightly greater than the rear portion of the longitudinal groove which penetrates the rear transverse groove, comprises a second, rear locking tab which is lockingly engaged and disengaged with the attachment bore of a larger diameter saw cup in the exact same manner as described above for the front nose piece boss.

BRIEF DESCRIPTION OF THE DRAWINGS

FIG. 11 is a view similar to that of FIG. 10, but showing a locking tab of the arbor holder pushed fully rearward.

FIG. 12 is a partly broken away side elevation view showing an arbor and pilot drill installed in the arbor holder of FIG. 2, and showing a front locking tab of a front, smaller diameter boss of the nose piece of the arbor holder being pressed against by the base wall of a small diameter saw cup preparatory to being insertably received in the small diameter attachment bore of the saw cup.

FIG. 13 is a view similar to that of FIG. 12, but showing the front nose piece boss of the arbor holder fully inserted and rotated clockwise into locking engagement with the attachment bore of the saw cup.

FIG. 14 is a view similar to that of FIG. 13, showing how the arbor holder is removed from the saw cup.

FIG. 15 is a view similar to that of FIG. 12, but showing a rear larger diameter boss of the nose piece of the arbor holder ready to be received into the larger diameter attachment bore of a large diameter saw cup.

FIG. 17 is a front elevation view of the large saw cup and arbor holder of FIG. 15.

FIG. 18 is a view similar to that of FIG. 17, but showing the saw cup rotated approximately 45 degrees clockwise with respect to the arbor holder, to initiate locking engagement between the saw cup and arbor holder.

FIG. 19 is a view similar to that of FIG. 18, but showing the saw cup rotated approximately 90 degrees into full axial-locking and rotation-limiting engagement with the arbor holder.

DESCRIPTION OF THE PREFERRED EMBODIMENTS

Figure 20:
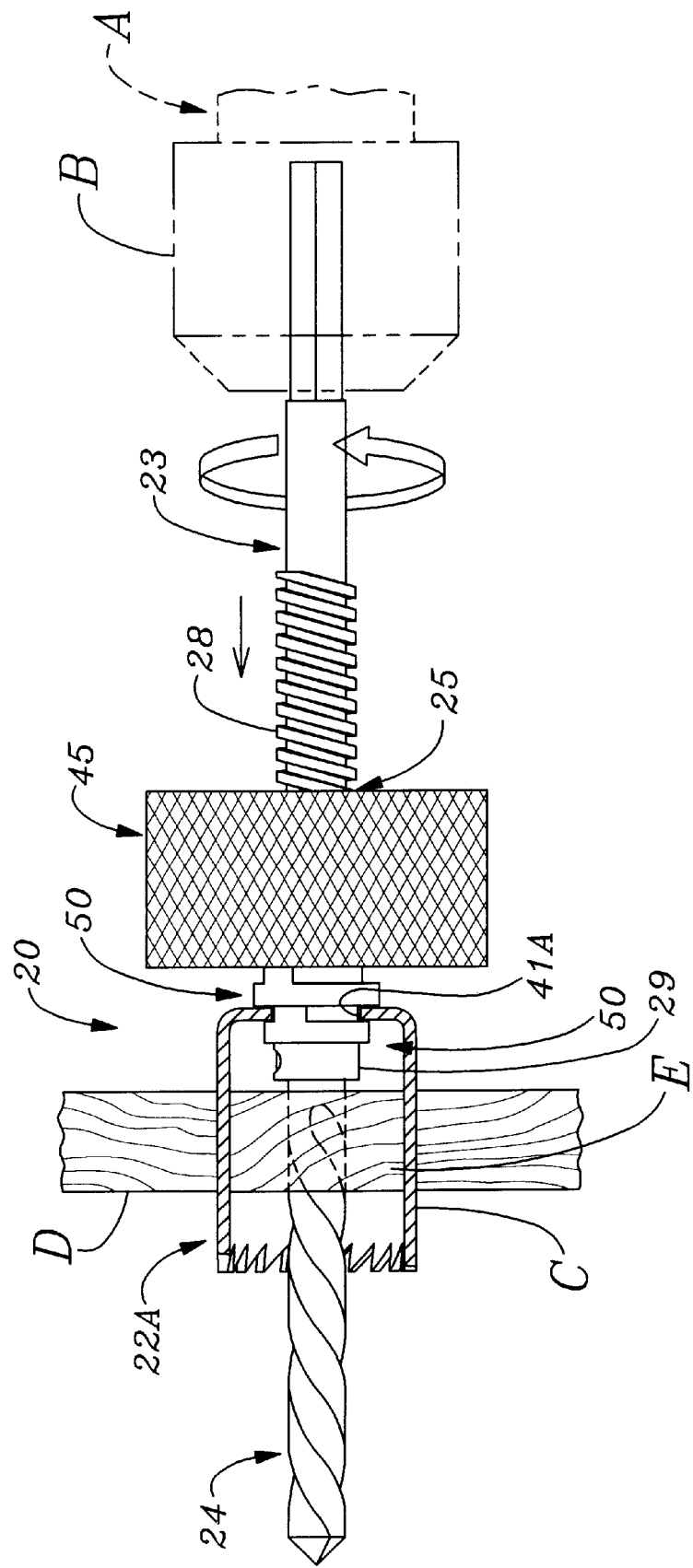
FIGS. 20–22 illustrate the manner of using the hole saw of FIG. 1 to cut a hole in a workpiece and eject a plug cut from the workpiece.
Figure 21:
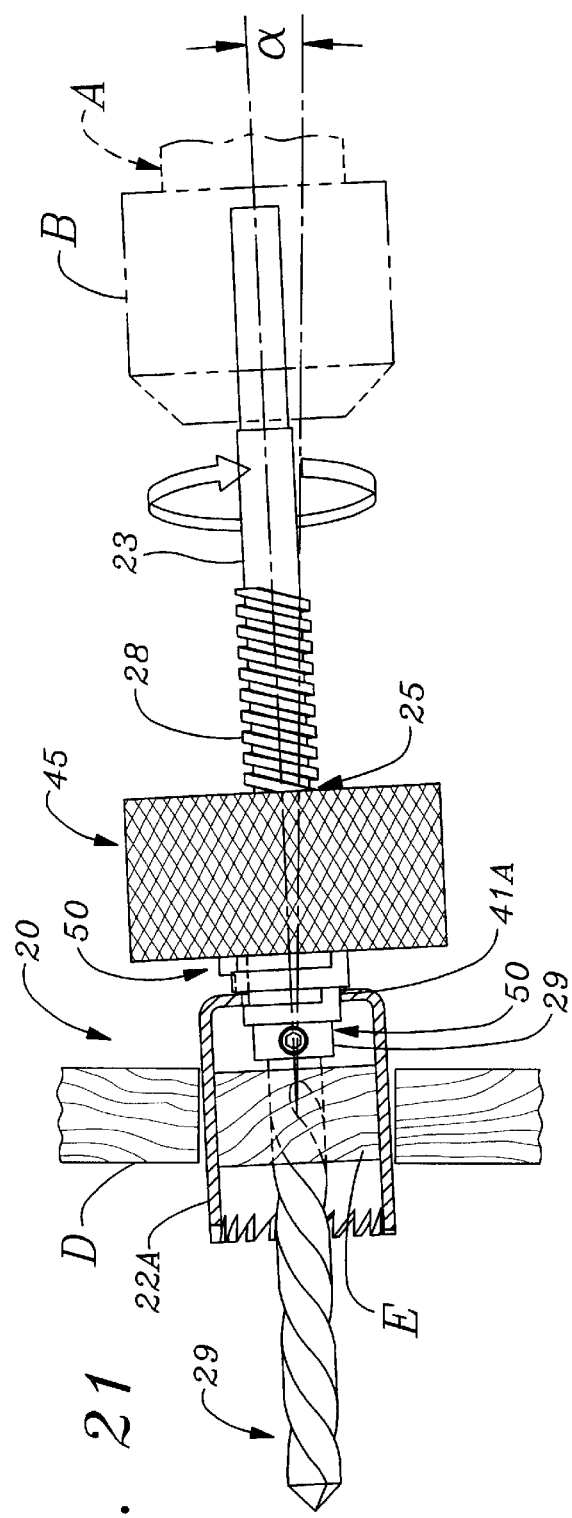
Figure 22:
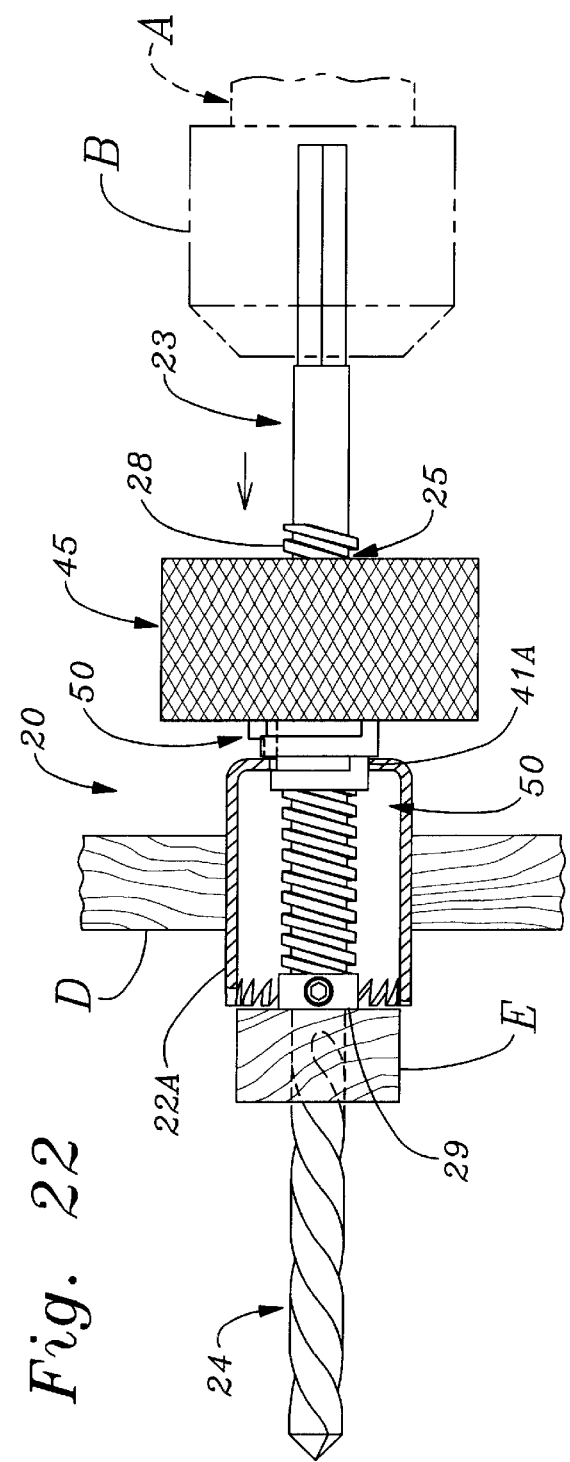

FIGS. 1–19 illustrate a main embodiment of a plug ejecting hole saw device with interchangeable saw cups having different size attachment bores according to the present invention, while FIGS. 20–22 illustrate how the hole saw is used.

Figure 1:
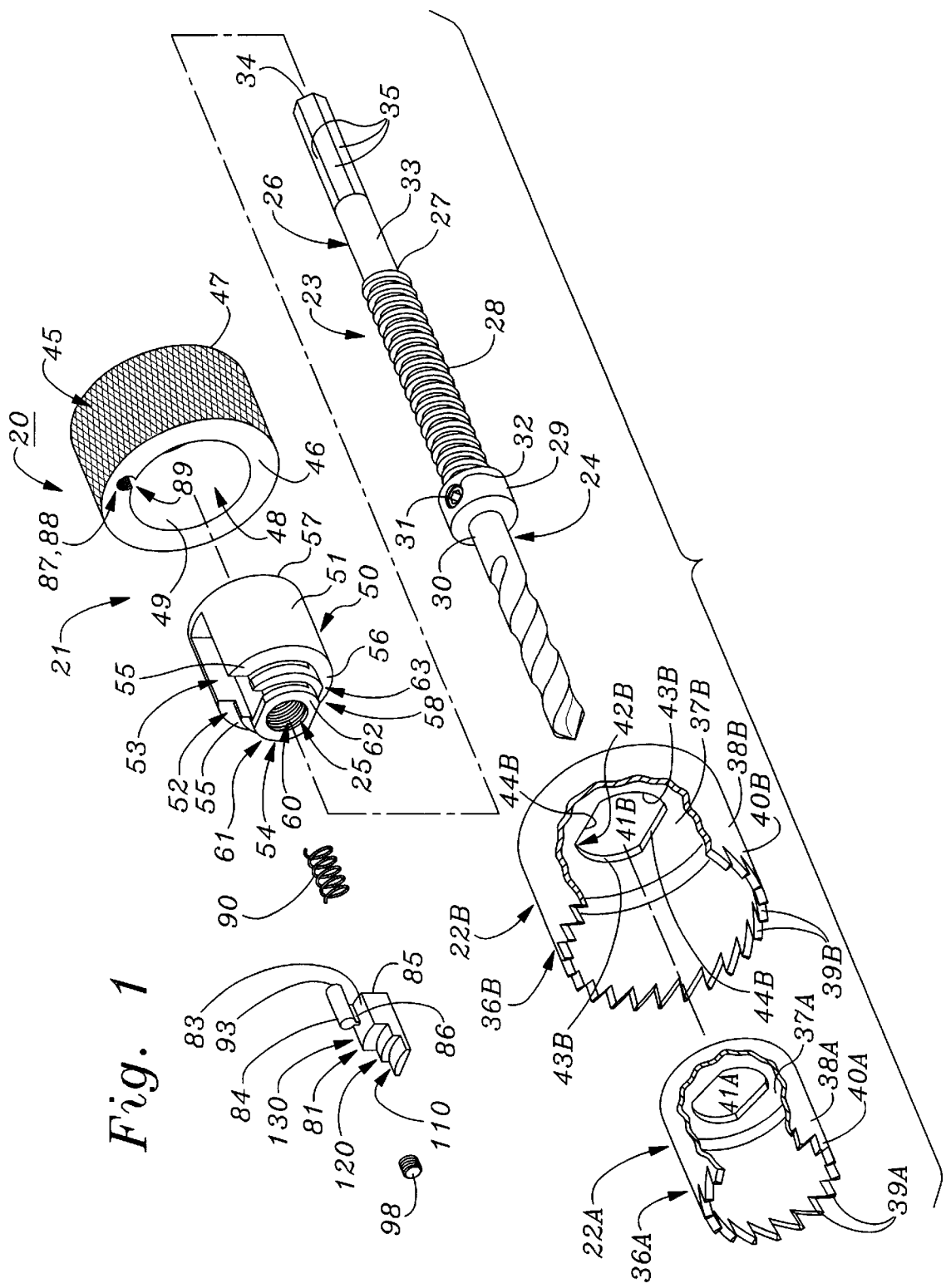
FIG. 1 is an exploded perspective view of a plug ejecting hole saw device with interchangeable saw cups having two different size attachment bores according to the present invention.

Referring first to FIG. 1, a plug ejecting hole saw 20 with interchangeable saw cups according to the present invention may be seen to include a novel arbor holder 21, saw cups 22A and 22B having small and large attachment bores 41A and 41B, respectively, removably fastenable to the arbor-holder, and an arbor 23 holding a pilot drill 24 threadably receivable within a threaded bore 25 provided through the length of the arbor-holder.

As shown in FIG. 1, arbor 23 includes a longitudinally elongated body 26 having a front portion 27 provided with external left-hand helical threads 28 which extend rearwardly from a front annular ring-shaped collet flange 29 which clampingly receives the rear shank 30 of pilot drill 24, as for example, by a set screw 31 tightened into a radial bore 32 in the collet flange, against the shank of the pilot drill. Arbor 23 also includes an intermediate unthreaded shank portion 33 which is disposed longitudinally rearward of front threaded portion 27 of the arbor, and a rear shank portion 34. Rear shank portion 34 is preferably provided with longitudinally disposed flats 35 forming a hexagonal cross section adapted to be clampingly received in the chuck of a power drill.

Referring still to FIG. 1, it may be seen that hole saw cup 22 comprises essentially a cylindrical cup-shaped body 36 having a circular base 37 and a downwardly depending cylindrical shell 38 which may be fabricated as a deep drawn article from relatively thin-gauge, e.g., 0.030–0.060 inch thick, high carbon steel, although the exact dimensions, materials, composition and other such details of the hole saw cup are not essential to the present invention. Hole saw cup 22 has a plurality of triangularly-shaped saw teeth 39 which protrude axially outwardly at regular circumferential intervals from front annular ring-shaped surface 40 of hole saw cup body 36. Teeth 39 may be formed by cutting and tempering hole-saw cup body 36, or may be fabricated separately as teeth of a toothed ring which is brazed to the front annular surface 40 of the saw cup body.

As shown in FIG. 1, base 37 of hole saw cup 22 has through its thickness dimension a non-circular attachment bore 41 concentric with front annular surface 40 and cylindrical shell 38 of hole saw cup body 36. Attachment bore 41 is preferably of a conventional shape adapted to receive prior-art hole saw arbor-holders. Thus, as shown in FIG. 1, attachment bore 41 has a "double-D" shaped perimeter wall 42 formed from a pair of diametrically opposed arc segments 43 of a circle concentric with front annular surface 40 of saw cup body 36, and a pair of diametrically opposed straight edge segments or flats 44 which are chords of the circle, and equidistant from and parallel to a diameter which perpendicularly bisects the arc segments. Thus, a preferred arbor attachment bore 41 through base 37 of hole saw cup 22 has a peripheral edge wall consisting of a pair of diametrically opposed, laterally symmetric circular arc segments 43 centered at ninety-degree and two-hundred and seventy-degree locations, respectively, of a circle concentric with body 36 of the hole saw cup, and two straight, flat diametrically opposed segments centered at zero-degree and one-hundred and eighty-degree locations, respectively, of the circle.

Referring now to FIGS. 2–11, in addition to FIG. 1, hole saw 20 according to the present invention may be seen to include a novel arbor-holder 21. As shown in those figures, arbor-holder 21 includes an outer cylindrically-shaped housing or collar 45. Collar 45 of arbor-holder 21 has front and rear transversely disposed, annular ring-shaped faces 46 and 47, respectively, which are perpendicular to the longitudinal axis of the collar. A circular cross section bore 48 is disposed axially, i.e., longitudinally through collar 45 and has an inner cylindrical wall surface 49 which longitudinally slidably receives outer cylindrical surfaces 51 of a generally cylindrically-shaped, longitudinally elongated locking body 50 received within the bore.

As shown in FIGS. 1–4, locking body 50 has a radially outer portion 52 having a generally cylindrical shape, modified by a longitudinally disposed, relatively deep, rectangular groove 53 formed in the outer wall surface 51 of the locking body, formed between circular arc-shaped cylindrical quadrant surfaces 55. As may be seen best by referring to FIGS. 6 and 7, radially outer portion 52 of locking body 50 preferably has a length slightly less than that of collar 45. Thus constructed, front annular surface 56 of outer radial outer portion 52 of locking body 50 is nearly coplanar or flush with front annular surface 46 of collar 45, while rear annular surface 57 of outer radial portion 52 is parallel to and recessed axially inwards from rear annular-shaped, transverse surface 47 of the collar.

As shown in FIGS. 1–4, locking body 50 has an inner radial portion 58 disposed coaxially within outer portion 52, the inner radial portion having disposed longitudinally therethrough a bore 25 having a left-handed threaded inner surface 60 for threadingly receiving arbor 23. As may be seen best by referring to FIGS. 1, 2, and 4, inner radial portion 58 of locking body 50 is provided with a front nose piece 54 which has a forward protruding front boss 61 that has a transversely disposed front face 62 located forward of front annular faces 56 and 46 of inner body portion 50 and collar 45.

Front nose piece boss 61 has a double-D-shaped transverse cross-sectional shape adapted to be congruently inserted into attachment bore 41A through base 37A of smaller hole saw cup 22A. In a preferred embodiment of hole saw 20, locking body 50 of arbor-holder 21 preferably includes a second, rear, double-D-shaped nose piece boss 63 of larger size than front nose piece 61 and having a front annularly-shaped face 64. Rear nose piece boss 63 is adapted to be congruently inserted into an attachment bore of larger size than front nose piece 61, enabling the arbor-holder to be used interchangeably with hole saw cups 22A and 22B having two different size arbor-mounting attachment bores 41A, 41B. However, as will be made clear in the ensuing description of the construction and function of hole saw 20, certain novel and advantageous advantages of the hole saw may be achieved with an arbor-holder having a single nose piece boss.

Referring now to FIGS. 1–11, it may be seen that a preferred, double nose piece embodiment of arbor-holder 21 according to the present invention includes a locking body 50 provided with a second, rear nose piece boss 63 having a front annularly-shaped transverse face 64 which is located forward of front annular surface 56 of outer radial portion 52 of locking body 50, and rearward of nose piece boss 61.

As shown in FIGS. 1–6, front nose piece boss 61 has a double-D-shaped transverse cross sectional shape. Thus, front nose piece boss 61 includes a pair of convexly curved, diametrically opposed side walls 66 disposed longitudinally between front annular face 62 of the nose piece boss and front annular face 64 of rear nose piece boss 63. Curved side walls 66 preferably are arcuately curved, having the shape of arc segments of a circle which coincides with a circle concentric with the longitudinal axis of front nose piece boss 61. Front nose piece boss 61 also includes a pair of flat, diametrically opposed side walls 67 disposed longitudinally between front annular face 62 of the nose piece and front annular face 64 of rear nose piece boss 63. Flat side walls 67 of front nose piece boss 61 are chords of the circle coincident with curved side walls 66, and are equidistant from and parallel to a diameter which perpendicularly bisects the arc segments.

As shown in FIGS. 1–4, front nose piece boss 61 of arbor-holder 21 has formed in arcuately curved longitudinal side walls 66 thereof a pair of transversely disposed, rectangular cross section, arc-shaped grooves 68 which extend radially inwardly from the outer longitudinal surface 69 of the curved side wall. Each of the two transversely disposed grooves 68 has a front or outer transverse side wall 70 located inwardly of and parallel to front face 62 of nose piece 61, forming therebetween an arc-shaped web 71. Also, each transverse groove 68 has a rear or inner side wall defined by and coextensive with front annular surface 64 of rear nose piece boss 63.

As may be seen best by referring to FIGS. 1, 2, 4 and 9–11, each of the two transverse grooves 68 of front nose piece boss 61 is disposed in a clockwise direction from a location clockwise of the intersection between a curved side wall 66 and flat side wall 67, thus forming a pair of upper and lower diagonally opposed longitudinal rib webs 72U, 72L, which are disposed rearwardly or longitudinally inwardly from front face 62 of the front nose piece. Thus, transverse grooves 68 form with front face 62 a pair of diametrically opposed front arc-shaped web flanges 71. Front nose piece boss 61 also has formed in upper flat longitudinal side wall 67 thereof a longitudinally disposed rectangular cross section groove 74. Longitudinal groove 74 is disposed rearwardly from a front edge wall 75 located inwardly of and parallel to front face 62 of front nose piece 61, forming therebetween a front transversely disposed rectangular web 73. Preferably, front edge wall 75 of longitudinal groove 74 is located forward of front edge wall 70 of transverse grooves 68.

Longitudinal groove 74 has a flat longitudinally disposed bottom wall 76 and longitudinally disposed side walls 77 which protrude upwardly from opposite lateral sides of the bottom wall. As may be seen best by referring to FIG. 1, longitudinal groove 74 is disposed rearwardly from front web 73 through an adjacent transverse groove 68, and penetrates front annular face 64 and outer cylindrical wall surface 78 of rear nose piece boss 63. Longitudinal groove 74 has a rear portion which is coextensive with groove 53 in body 50 and thus has a rear transversely disposed end wall 79 located forward or axially outwardly of rear annular face 57 of radial outer portion 52 of body 50, forming therebetween a rear transversely disposed web 80.

Figure 2:
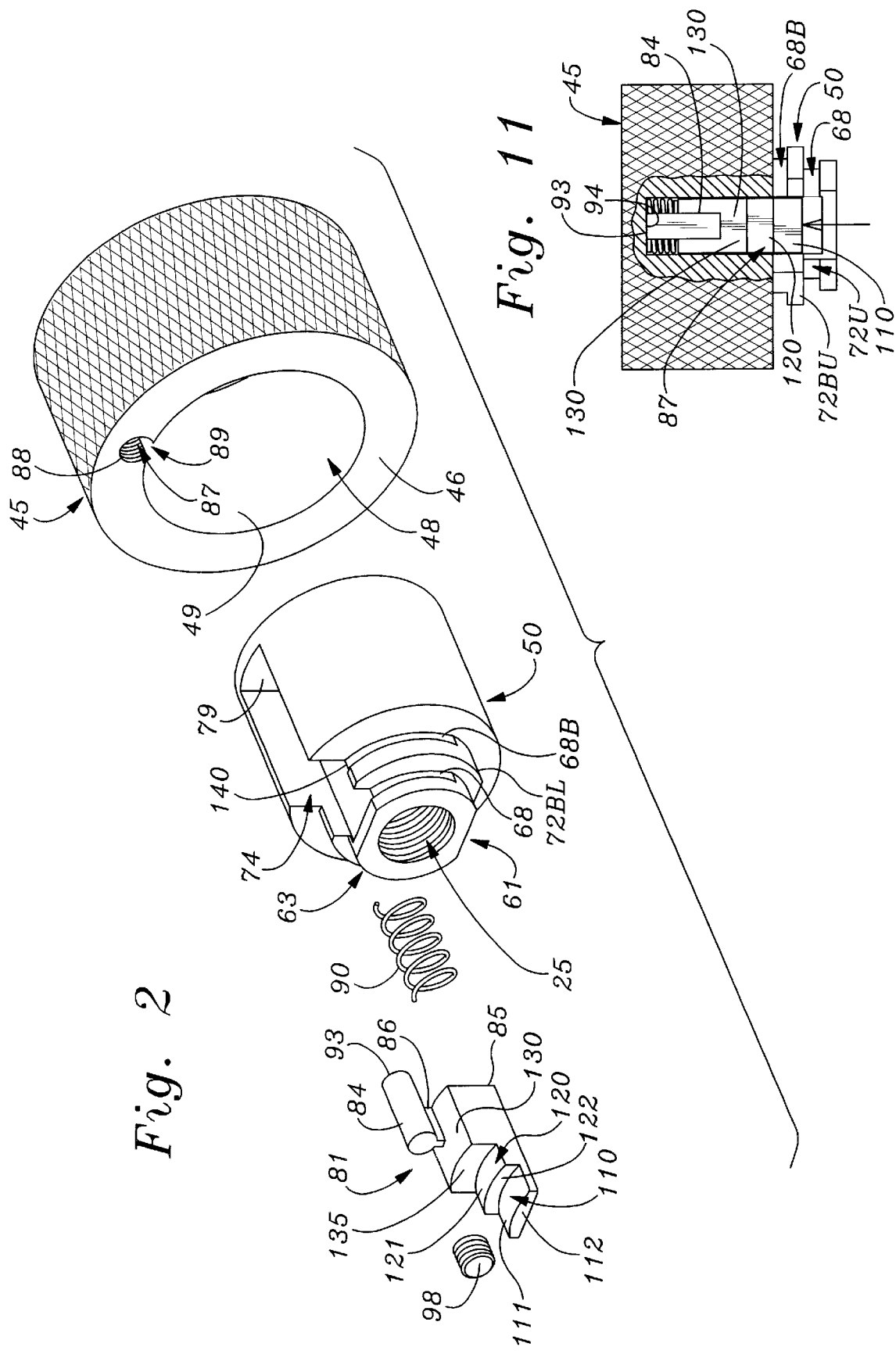
FIG. 2 is an exploded perspective view of a mandrel holder or arbor holder of the device of FIG. 1.
Figure 3:
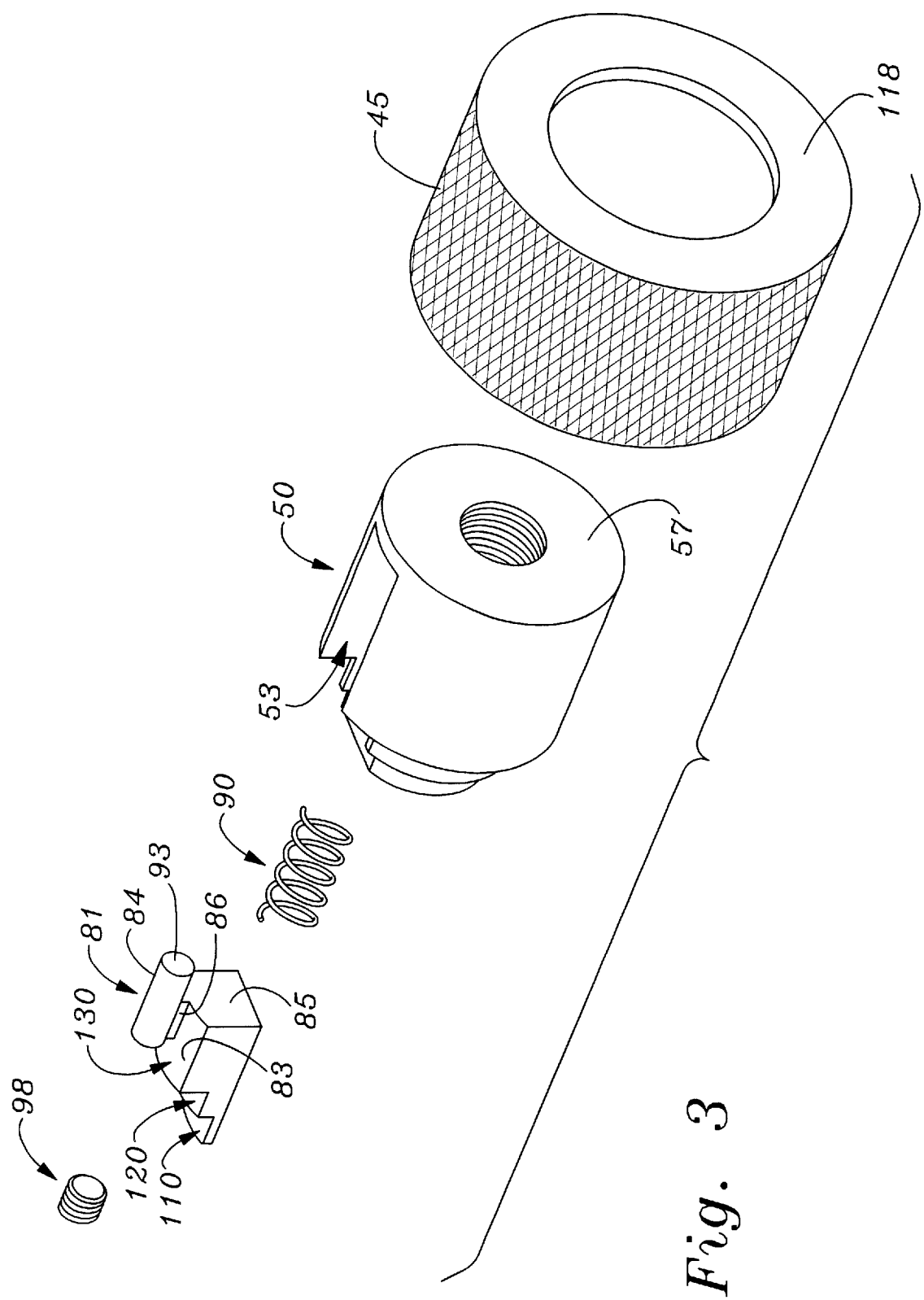
FIG. 3 is a rear view of the structure of FIG. 2.

Referring now to FIGS. 1, 2 and 3, it may be seen that arbor-holder 21 includes a locking lug 81 longitudinally slidably received within longitudinal groove 74 in locking body 50. Locking lug 81 has the shape of a longitudinally elongated, rectangular step-shaped block which has a first front rectangularly block-shaped front step portion 110, a second, middle step 120 of greater height than the first step, and a third, block-shaped rear portion 130 of greater height than the second step. As will be described in detail below, front step 110 of lug 81 serves to lock front nose piece boss 61 of arbor-holder 21 within attachment bore 41A of small hole saw cup 22A, and will henceforth be referred to as a first front locking tab. Similarly, step 120 serves as a second, rear locking tab in rear nose piece boss 63, for use with larger hole saw cups 22B. As shown in FIG. 2, the upper surfaces 111 and 121 of first and second locking tab steps 110,120 are preferably arcuately convexly curved, to facilitate insertion of the steps into the attachment bore 41 of a hole saw cup 22. Also, the left or counterclockwise intersection 112 between front vertical face 113 and left vertical face 114 of front step 110 is preferably radiused to facilitate entrance of a peripheral edge wall of an attachment bore 41 of a hole saw cup into a transverse groove 60. On the other hand, right-hand or clockwise corner 115 of front step 110 may be square.

As shown in FIGS. 1 and 3, locking lug 81 has protruding from the upper surface 83 of rear step 130 thereof a longitudinally elongated cylindrical retainer pin 84 which protrudes rearward of rear transverse surface 85 of the locking lug. As may be seen best by referring to FIGS. 1 and 3, retainer pin 84 of locking lug 81 is joined to the upper surface 83 of the locking lug by a thin, longitudinally disposed rectangular web 86 which depends downwardly from the lower cylindrical surface of the locking pin.

Referring now to FIG. 2, it may be seen that collar 45 is provided with a longitudinally disposed blind bore 87 which extends longitudinally rearward from front annular surface 46 of the collar. Bore 87 is adjacent and parallel to inner cylindrical wall surface 49 of the collar, and has a circular radially outwardly located portion 88 adapted to axially slidably receive retainer pin 84. Also, bore 87 has at an inner radial edge thereof a longitudinally disposed rectangular slot 89 which penetrates the outer circular radial portion 88 of the bore at an outer radial edge of the slot and which penetrates the inner cylindrical wall surface 49 of the collar at an inner radial edge of the slot. Slot 89 is provided to longitudinally slidably receive web 86 joining retainer pin 84 to locking lug 81.

As may be best understood by referring to FIGS. 1–3, locking lug 81 is preferably installed in arbor-holder 21 by first positioning the inner block-shaped portion of the locking lug in the front portion of longitudinal groove 74 in locking body 50, with a helical compression spring 90 bearing against rear wall surface 79 of the groove and rear wall surface 85 of the locking lug. Locking body 50 is then positioned coaxially forward of front surface 46 of collar 45 with retainer pin 84 axially aligned with retainer pin bore 87, and the locking body is inserted axially forward into bore 48 of collar 45, simultaneously with insertion of retainer pin 84 into retainer pin bore 87. Rearward motion of locking lug 81 relative to front annular surface 46 of collar 45 is limited by contact between rear face 93 of retainer pin 84 abutting rear transverse end wall 94 of retainer pin bore 87, as shown in FIG. 11. Forward axial motion of locking lug 81 is limited by a set screw 98 threaded into the entrance of locking lug retainer bore 87. Thus limited in forward motion, front face 135 of rear step 130 of locking lug 81 is coplanar or flush with front annular surface 46 of collar 45.

Compression spring 90 of locking lug 81 of arbor-holder 21 also provides means for spring biasing locking body 50 axially rearwardly within bore 48 of collar 45, so that front annular face 56 of radially outer portion 52 of locking body 50 is coplanar or flush with front annular face 46 of collar 45.

Figure 4:
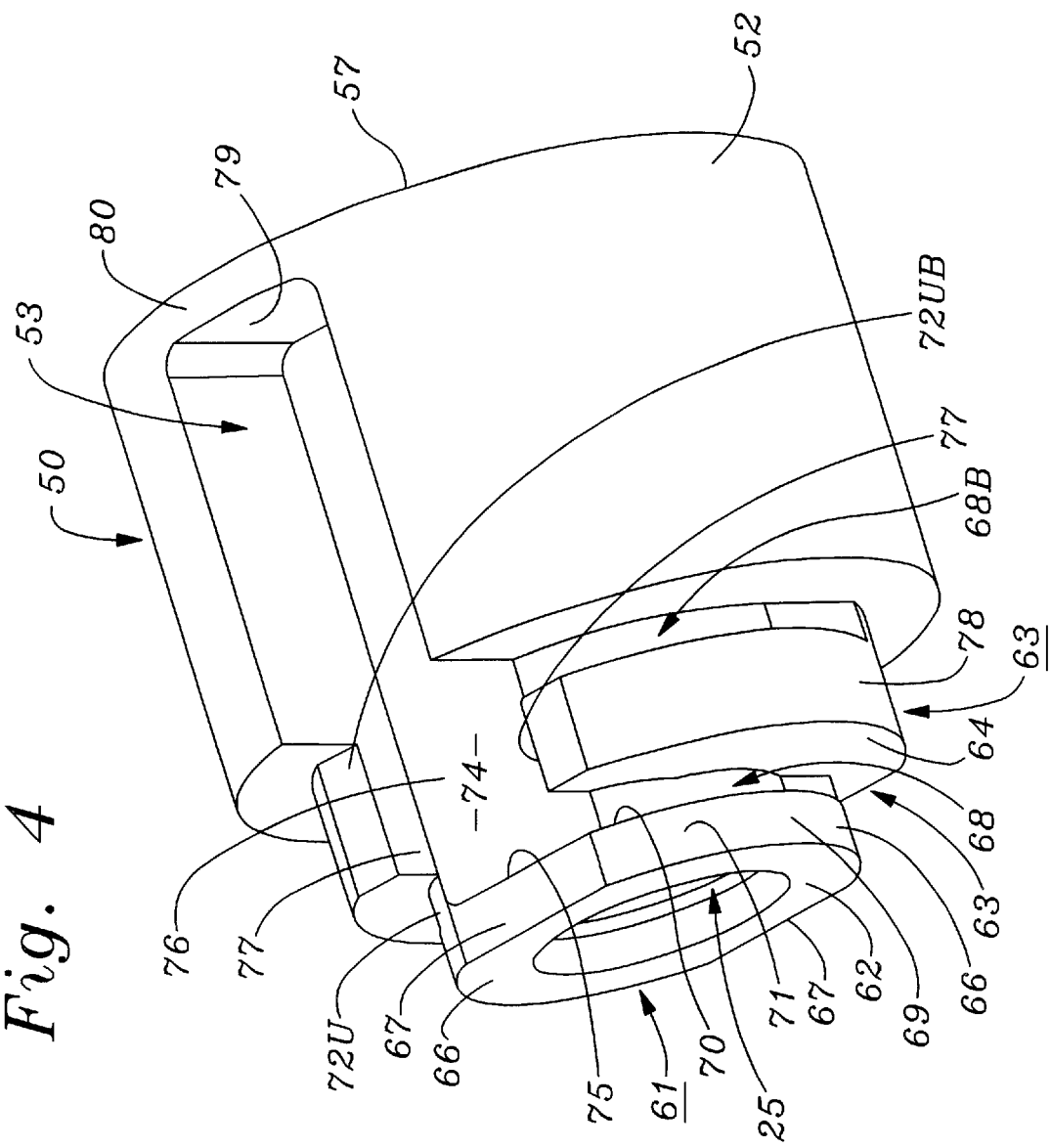
FIG. 4 is an upper perspective view of locking body of the device of FIG. 1, on an enlarged scale.
Figure 5:
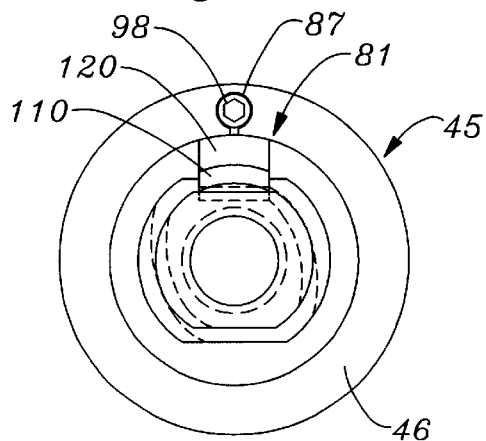
FIG. 5 is a front elevation view of an arbor holder of the device of FIG. 1.
Figure 6:
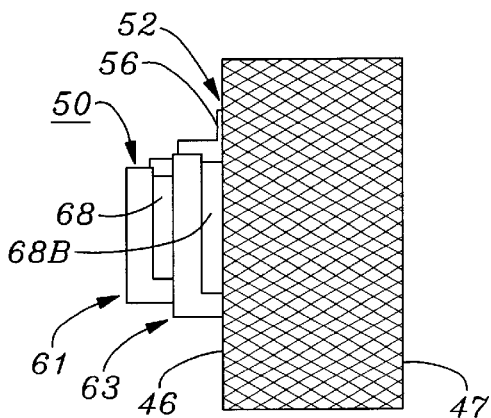
FIG. 6 is a right side elevation view of the arbor holder of FIG. 5.
Figure 7:
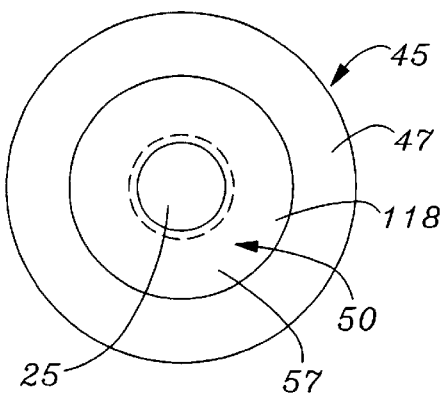
FIG. 7 is a rear elevation view of the arbor holder of FIG. 5.
Figure 8:
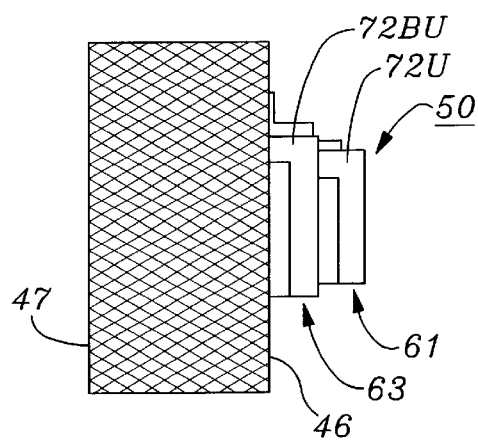
FIG. 8 is a left side elevation view of the arbor holder of FIG. 5.
Figure 9:
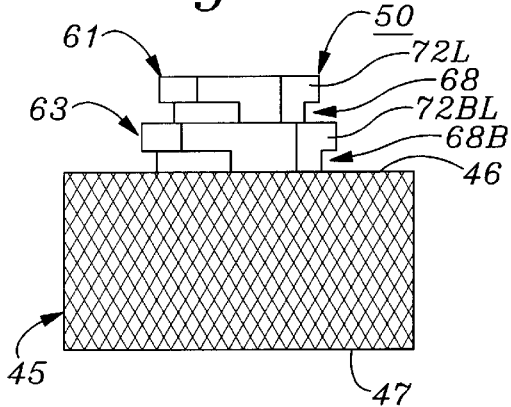
FIG. 9 is a lower plan view of the arbor holder of FIG. 5.
Figure 10:
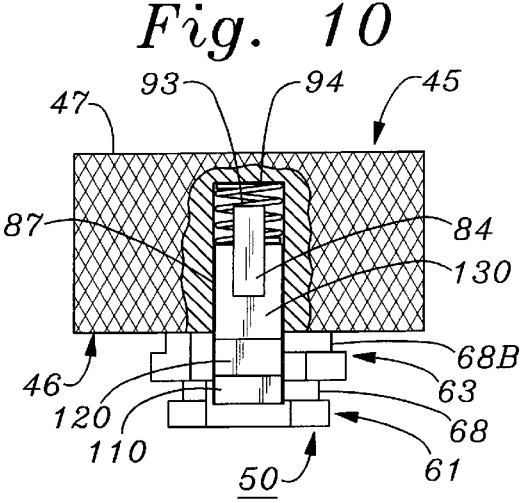
FIG. 10 is a partly broken away, upper plan view of the arbor holder of FIG. 5.

As may be best understood by referring to FIGS. 1, 2 and 4, forward motion of locking tab lug 81 in response to an extension force exerted by spring 90 on rear surface 85 of the locking tab lug is limited by contact of front surface 112 of front locking tab 110 with front edge wall 75 of longitudinal groove 74. Also, since retainer pin 84 of locking lug 81 is captivated in bore 87 of collar 45, forward motion of body 50 in collar 50 is limited by the same means as described above.

As will be made clear in the description of the operation of arbor-holder 21 presented below, attachment of the arbor-holder to a saw cup entails insertion of a nose piece boss, e.g., front nose piece boss 61, of the arbor-holder 21 into attachment bore 41 of a hole saw cup 22, and axial inward or rearward motion of locking lug 81 while inner locking body 50 is held axially fixed within collar 45. Rearward movement of inner locking body 50 relative to collar 45 during this step is prevented by abutting contact between rear surface 57 of locking body 50 with an annular shoulder flange 118 contiguous with rear face 47 of collar 45.

As shown in FIGS. 1–11, rear nose piece 63 is larger than front nose piece 61, but otherwise structurally and functionally identical to the front nose piece. Thus, rear nose piece 63 has a pair of transverse grooves 68B which are disposed clockwise from a pair of diagonally opposed longitudinal rib webs 72B, and rearwardly from front annular surface 64 of the rear nose piece forming therewith a pair of diametrically opposed, arc-shaped web flanges 71B. As shown in the figures, rear corner 140 of right-hand web flange 71B preferably is radiused, i.e., arcuately convexly curved, to facilitate entrance of a peripheral edge wall of an attachment bore 41 of a hole saw cup into transverse groove 68B. Grooves 68B are blocked by intermediate step 120 with locking lug 81 in its forward biased location, and unblocked when step 120 is pushed rearward against spring 90 by base 37B of saw cup 22B which is pushed against front surface 122 of rear locking tab 120.

A most preferred embodiment of a plug ejecting hole saw according to the present invention has been described above, and a preferred method of using the device is described below. Modifications which may optionally be made to the most preferred embodiment include the following.

In a first modification, the arbor holder may be provided with a second, lower longitudinal groove holding a second locking tab and associated structural elements identical to the upper groove and locking tab elements, the second locking tab groove and elements located in lower portion of the arbor holder at locations diametrically opposed to the location of the corresponding first, upper locking tab elements. This modification may be chosen when it is desired to reduce torque stresses exerted on a single locking tab or increasing the total amount of torque exertable by the double-locking tab embodiment.

In a second modification of a plug ejecting hole saw according to the present invention, the nose could be provided with a different number of bosses, e.g., one or three, to accommodate hole saws with a single attachment bore size, or three different attachment bore sizes. This modification would of course use locking tabs with one or three steps, respectively. Moreover, this modification could also have a second, lower locking tab in addition to a first locking tab, as in the first modification described above.

Operation of the Invention

The novel functional characteristics of hole saw 20 according to the present invention may be best understood by referring to FIGS. 1 and 12–19.

Figures 12, 13:
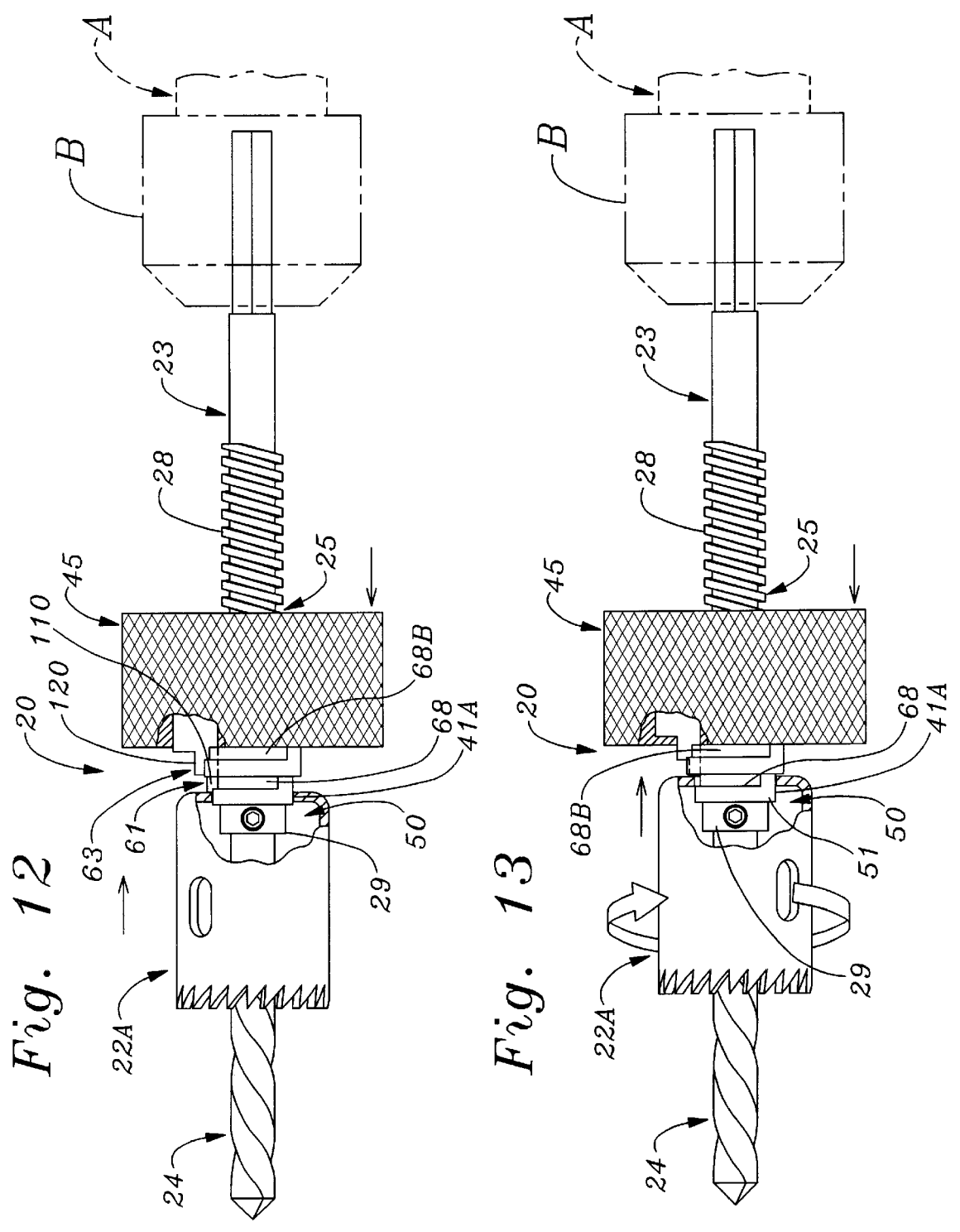

Referring now to FIGS. 1, 12–19, arbor-holder 21 of hole saw 20 is shown with threaded intermediate shank portion 33 of an arbor 23 threaded into threaded bore 25 through the arbor-holder. As is shown in FIGS. 12 and 17, the flat and curved portions of the longitudinal side walls of front nose piece boss 61 are initially axially aligned with corresponding flat and curved side walls of attachment bore 41 through base 37 of hole saw cup 22A, and the nose piece boss pushed forward into the attachment bore of the saw cup. During this installation step, axially inward or rearward motion of nose piece boss 61 with respect to collar 45 is prevented by rear surface 53 of locking body 50 abutting rear shoulder flange 118 of collar 45. (See FIG. 3)

As shown in FIG. 12, inserting front nose piece boss 61 of arbor-holder 21 sufficiently far into hole saw cup arbor attachment bore 41 causes rear surface 106 of hole saw cup base 37 to contact front surface 112 of front locking tab 110 and press the front locking tab rearwardly or inwardly within longitudinal locking tab groove 74. As shown in FIG. 13, rearward motion of front locking tab 110 causes the front edge wall 112 of the front locking tab to be pushed rearward of the rear edge wall of transverse groove 68, thus unblocking and extending the effective circumferential extent of the transverse groove counterclockwise to an axially disposed rib which is located counterclockwise of longitudinal groove 74, from the former limit formed by a clockwise longitudinal edge wall of locking tab 110. The increased effective length of transverse groove 68 permits front nose piece 61 of the arbor-holder to be rotated counterclockwise with respect to hole saw cup body, as viewed from the front of the arbor-holder and saw cup and shown in FIG. 9. This rotation is enabled by the web portion of attachment bore 41 of saw cup base 37 being slidably received within that portion of longitudinal groove 74 comprising an extension of transverse groove 68, and which is normally blocked by locking tab 110 urged forward by locking lug spring 90.

Figure 16:
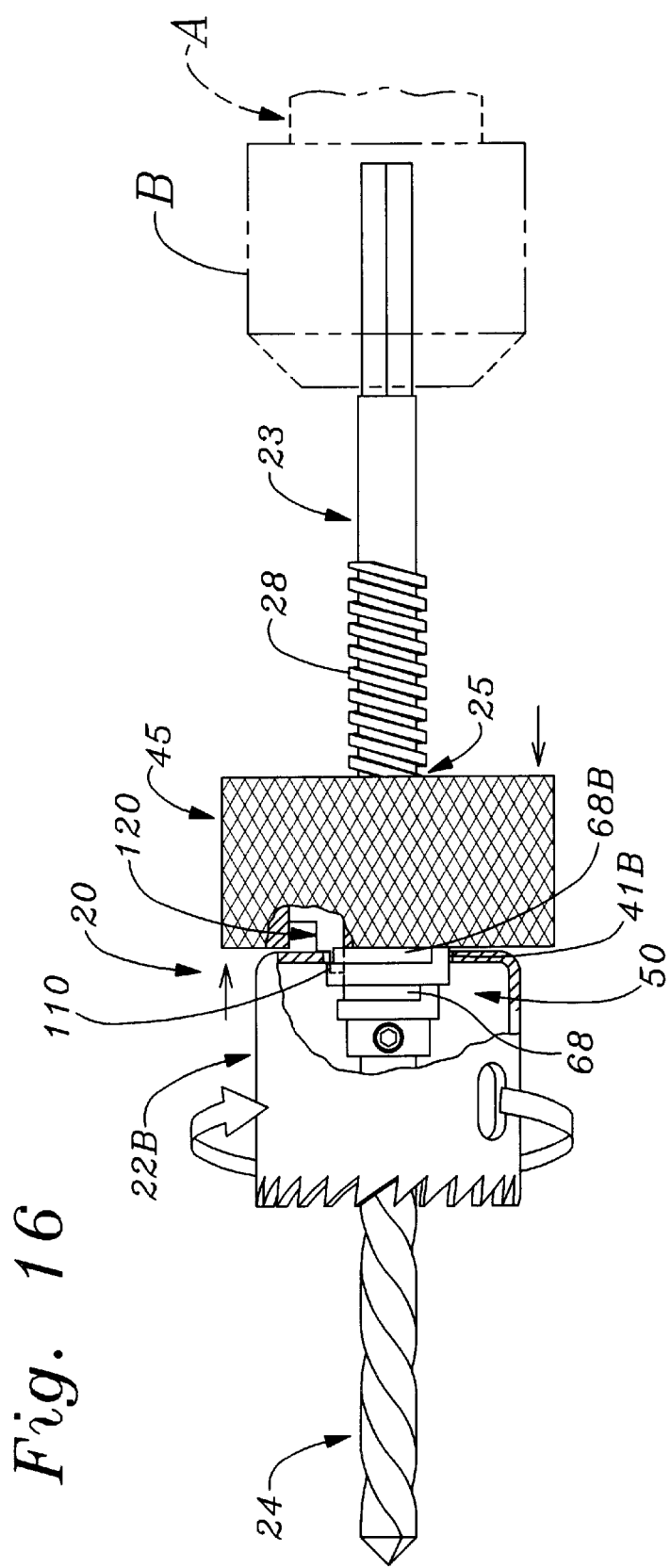
FIG. 16 is a view similar to that of FIG. 15, but showing the rear nose piece boss of the arbor holder fully inserted and rotated clockwise into locking engagement with the attachment bore of the saw cup.

As shown in FIGS. 16–18, when front nose piece boss 61 of arbor-holder 21 has been rotated about 45 degrees with respect to its axially aligned initial position with respect to attachment bore 41 of hole saw cup 22, radial clearance space between flat portion 67 of the front nose piece boss 61 and curved inner peripheral edge wall 43 of the attachment bore becomes sufficient to allow forward motion of locking tab 110 into the clearance space. Further counterclockwise motion of front nose piece boss 61 within attachment bore 41 of saw cup 22, which is limited to about 22-½ degrees by contact of a counterclockwise longitudinal rib 72U, with a first intersection 117A between the opposed curved peripheral edge wall 43 and straight peripheral edge wall 44 of attachment bore 41, enables locking tab 110 to be fully inserted into the attachment bore 41A of a small hole saw cup 22A, or locking tabs 110 and 120 to be fully inserted into the attachment bore 41B of a larger saw cup 22B, as shown in FIG. 19. Moreover, clockwise rotation of arbor-holder 21 with respect to hole saw cup 22 is limited to about 22-½ degrees by abutting contact between the clockwise edge of locking tab 110, 120 and a second intersection 117B between a curved peripheral wall 43 and a straight peripheral wall 44 of attachment bore 41, that intersection being located clockwise of a second longitudinal nose piece rib 72L. Thus installed, saw cup 22 is fixed against longitudinal movement with respect to front nose piece boss 61 of arbor-holder 21 by front rear edge walls of transverse front nose piece boss grooves 68 embracing perimeter wall 42 of saw cup attachment bore 41 (see FIG. 13), against counterclockwise rotation of the arbor-holder relative to the saw cup by a longitudinal nose piece rib 72 abutting the attachment bore perimeter wall, and against clockwise rotation by a locking tab 110, 120 abutting the attachment bore perimeter wall.

FIGS. 20–22 illustrate how hole saw 20 according to the present invention is used to cut a hole through a workpiece and eject a workpiece plug from the saw.

Referring first to FIG. 20, arbor 23 of hole saw 20 is shown clamped in the chuck B of a power drill A, and the drill powered on to rotate the arbor of arbor-holder 21 and hole saw cup 22 in a clockwise sense to bore a circular hole C through a workpiece D, e.g., a wooden door panel, and thus lodging a cylindrically-shaped plug E cut from the workpiece within the bore of the saw cup.

As shown in FIG. 21, the longitudinal axis of drill A and hole saw 20 are then cocked at an angle with respect to a perpendicular to the longitudinal axis of hole C, lodging the outer surface of hole saw cup 22 against the inner peripheral wall surface of hole C. Then, as shown in FIG. 22, drill A is powered to turn hole saw 22 in a counterclockwise direction. This action causes left-hand threaded arbor 23 to threadingly advance outwardly from the threaded bore of arbor-holder 23, thus advancing collet flange 29 into abutting contact with the rear surface of plug E and pushing plug E out from the bore of saw cup 22.

Arbor-holder 21 may be readily removed from a hole saw cup 22 and attached to a different hole saw cup, by first grasping collar 45, and pulling axially rearwardly. This action retracts locking tab 82 axially inwardly within longitudinal nose piece groove 74 from transverse groove 68, thus allowing collar 45 to be rotated ninety degrees clockwise to align the contours of front nose piece boss 61 with those of saw cup attachment bore 41, thus permitting the arbor-holder to be pulled rearward to thereby retract the nose piece boss from the attachment bore of the saw cup.

If it is desired to attach arbor-holder 21 to a hole saw cup 22 having a different size attachment bore, e.g., a larger bore such as that of saw cup 22B, larger diameter, rear nose piece boss 63 is inserted into, locked to, and unlocked from the larger attachment bore in the exact same fashion described above for front nose piece boss 61.

In a modification of the plug ejecting hole saw described above, the arbor holder and arbor are provided with right-hand threads, thus providing all of the advantages of the basic embodiments described above, including quick interchangeability of different size saw cups, without the plug ejecting capability.

What is claimed is:

1. An arbor holder for releasable attachment to a hole saw cup of the type having a front annular cutting surface, a cylindrical body terminated at a rear end thereof by a rear transversely disposed circular base wall having through its thickness dimension a non-circular attachment bore concentric with said front annular cutting surface and said body, said arbor holder comprising;
    a. a generally cylindrically-shaped collar having therethrough a longitudinally disposed bore,
    b. a generally cylindrically-shaped body longitudinally slidably held within said bore of said collar, said body having disposed longitudinally therethrough a coaxial bore for receiving an arbor and a nose piece which protrudes forward of said collar, said nose piece having at least a first, forward protruding front nose-piece boss that has a non-circular transverse cross sectional shape insertable into a first size attachment bore of a saw cup,
    c. at least a first transversely disposed groove formed in said front nose piece having an entrance opening for rotatably receiving in a first, forward direction a first segment of a peripheral edge wall of said attachment bore of said saw cup,
    d. first releasable locking tab means movable forward to block said entrance opening of said transverse groove and thereby limit reverse rotation of said saw cup, thereby securing said saw cup to said arbor, and movable rearward to unblock said entrance opening of said transverse groove,
    e. means for limiting rearward movement of said cylindrical body relative to said collar, and
    f. means for limiting forward movement of said cylindrical body relative to said collar.

2. The arbor holder of claim 1 wherein said first locking tab means is further defined as comprising in combination a lug having a rear portion and a shorter first, front step portion, comprising a first, front locking tab, said lug being longitudinally slidably located in a longitudinal groove formed in said front nose piece boss, said longitudinal groove intersecting said transverse groove, said lug being resiliently biased forward by spring means to block said entrance opening to said transverse groove with said first locking tab, and resiliently movable rearward in said longitudinal groove by rearward abutting contact of said saw cup base to thereby retract said first locking tab and thereby unblock said transverse groove.

3. The arbor holder of claim 2 wherein said spring means is further defined as comprising in combination a compression spring resiliently bearing at a front end thereof against a rear surface of said lug and bearing at a rear end thereof against a front face of a rear wall of said longitudinal groove formed in said cylindrical body.

4. The arbor holder of claim 3 further including means for limiting forward motion of said lug, said means comprising in combination a rearwardly protruding retainer pin attached to said lug, and a blind bore disposed longitudinally within said collar, said retainer pin being slidably held within said bore.

5. The arbor holder of claim 1 wherein said means for limiting rearward movement of said body relative to said collar comprises a member located rearward of said body which is attached to said collar.

6. The arbor holder of claim 4 wherein said member is further defined as a transversely disposed flange coplanar with a rear surface of said collar, said flange having an inner diameter smaller than that of said bore through said collar.

7. The arbor holder of claim 2 further including a second, rear nose piece boss of larger diameter than said first, front nose-piece boss, said second nose-piece boss having a non-circular transverse cross sectional shape insertable into a second, larger size saw cup attachment bore.

8. The arbor holder of claim 7 wherein said locking tab means lug is further defined as having a second, middle step portion which is higher than said first step, said second step portion comprising a second, rear locking tab which is resiliently retractable within a longitudinal groove of said rear nose-piece boss to unblock an adjacent transverse groove in said rear nose-piece boss.

9. The arbor holder of claim 2 further including a second, transversely disposed groove in said front nose-piece boss spaced circumferentially apart from and transversely aligned with said first transverse groove, said second front transverse groove having an entrance opening for rotatably receiving in a first, forward direction a second segment of a peripheral edge wall of said attachment bore of said saw cup.

10. The arbor holder of claim 9 further including a second releasable locking tab means comprising in combination a lug having a rear portion and a shorter first, front step portion, comprising a first, front locking tab, said lug being longitudinally slidably located in a second longitudinal groove formed in said front nose-piece boss, said second longitudinal groove intersecting said second transverse groove, said lug being resiliently biased forward by spring means to block said entrance opening to said second transverse groove with said second locking tab, and resiliently movable rearward in said longitudinal groove by rearward abutting contact of said saw cup base to thereby retract said second locking tab and thereby unblock said second transverse groove.

11. The arbor holder of claim 10 further including a second, rear nose-piece boss of larger diameter than said first, front nose-piece boss, said second nose-piece boss having a non-circular transverse cross sectional shape insertable into a second, larger size saw cup attachment bore.

12. The arbor holder of claim 11 wherein said second locking tab means lug is further defined as having a second, middle step portion which is higher than said first step, said second step portion comprising a second, rear locking tab which is resiliently retractable within a second longitudinal groove in said rear nose-piece boss to unblock an adjacent transverse groove in said rear nose-piece boss.

13. An arbor holder for releasable attachment to a hole saw cup selected from first and second pluralities of hole saw cups of the type having a front annular cutting surface, a cylindrical body terminated at a rear end thereof by a rear transversely disposed circular base wall having through its thickness dimension a non-circular attachment bore concentric with said first annular cutting surface and said body, said attachment bore of said first plurality of hole saw cups having a first diameter, and said attachment bore of said second plurality of hole saw cups having a second diameter larger than said first diameter, said arbor holder comprising;

a. a generally cylindrically-shaped collar having therethrough a longitudinally disposed bore, b. a generally cylindrically-shaped body longitudinally slidably held within said bore of said collar, said body having disposed longitudinally therethrough a coaxial bore internally threaded for receiving an externally threaded arbor and a nose-piece provided with a first, front nose-piece boss which protrudes forward from said collar, said front nose-piece boss having a non-circular transverse cross sectional shape insertable into said first smaller diameter attachment bore of said first plurality of hole saw cups, and a second, rear nose-piece boss of larger diameter rearward of said front nose-piece boss, said second, rear nose-piece boss being insertable into a said second, larger diameter attachment bore of said second plurality of hole saw cups, each of said front and rear nose-piece bosses having formed therein at least a first transversely disposed groove having an entrance opening for rotatably receiving in a first forward direction a first peripheral segment of a peripheral edge wall of a small saw cup attachment bore and a large saw cup attachment bore, respectively, and at least a first longitudinal groove disposed longitudinally within said body, said longitudinal groove longitudinally slidably holding a locking tab lug which is resiliently biased forward in said groove by spring means to thereby block with a first, front locking tab an entrance opening to said first front nose-piece transverse groove, and with a second, rear locking tab an entrance opening to said first rear nose-piece transverse groove, said locking lug being resiliently movable rearwards to unblock said openings of said first front and rear transverse grooves to thereby unblock said transverse grooves, c. means for limiting rearward movement of said cylindrical body relative to said collar, and d. means for limiting forward movement of said cylindrical body relative to said collar.

14. The arbor holder of claim 13 wherein said locking tab lug is further defined as having a first, short, front, step-shape portion comprising said first, front locking tab, and a second, middle step-shaped portion having a greater height than said first, front step portion, said middle step-shaped portion comprising said second, rear locking tab.

15. The arbor holder of claim 14 wherein said spring means is further defined as comprising in combination a compression spring resiliently bearing at a front end thereof against a rear surface of said lug and bearing at a rear end thereof against a front face of a rear wall of said longitudinal groove formed in said cylindrical body.

16. The arbor holder of claim 15 further including means for limiting forward motion of said lug, said means comprising in combination a rearwardly protruding retainer pin attached to said lug, and a blind bore disposed longitudinally within said collar, said retainer pin being slidably held within said bore.

17. The arbor holder of claim 13 wherein said means for limiting rearward movement of said body relative to said collar is further defined as a flange disposed transversely across a rear surface of said collar, said flange having an annular ring-shape coaxial with said bore of said collar.

18. The arbor holder of claim 17 wherein said threaded bore in said coaxial body is further defined as having left-hand threads.

19. The arbor holder of claim 18 further including an arbor holding a pilot drill, said arbor threadingly held within said bore of said arbor holder.

20. The arbor holder of claim 19 further including a saw cup having an attachment bore rotatably engaged with one of said transverse grooves of said first and second nose-piece bosses.

* * * * *